US012730444B2

(12) United States Patent
Chung et al.

(10) Patent No.: US 12,730,444 B2
(45) Date of Patent: Sep. 8, 2026

(54) MOBILE ROBOT CAPABLE OF EVALUATING SELF-TRAINING BASED TRAVERSABILITY

(71) Applicant: Korea University Research and Business Foundation, Seoul (KR)

(72) Inventors: Woojin Chung, Seoul (KR); Hyunsuk Lee, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 391 days.

(21) Appl. No.: 17/564,788

(22) Filed: Dec. 29, 2021

(65) Prior Publication Data

US 2022/0206491 A1 Jun. 30, 2022

(30) Foreign Application Priority Data

Dec. 29, 2020 (KR) ........................ 10-2020-0185906

(51) Int. Cl.

*G05D 1/00* (2024.01)
*G01S 17/89* (2020.01)
*G01S 17/931* (2020.01)

(52) U.S. Cl.

CPC ............ *G05D 1/0088* (2013.01); *G01S 17/89* (2013.01); *G01S 17/931* (2020.01); *G05D 1/024* (2013.01); *G05D 1/0274* (2013.01)

(58) Field of Classification Search

CPC ............ G05D 1/00; G05D 1/02; G05D 1/021; G05D 1/0231; G05D 1/0238;

(Continued)

(56) References Cited

U.S. PATENT DOCUMENTS 10,330,787 B2 6/2019 Melvin et al.
2020/0012292 A1 1/2020 Park et al.

(Continued)

FOREIGN PATENT DOCUMENTS

JP 5482323 B2 2/2014
KR 101242253 B1 * 3/2013 ............. B25J 13/08
KR 10-1449161 B1 10/2014

OTHER PUBLICATIONS

Benjamin Sugar, Traversability Analysis for Mobile Robots in Outdoor Environments: A Semi-Supervised Learning Approach Based on 3D-Lidar Data, 2015 (Year: 2015).*

(Continued)

*Primary Examiner* — Khoi H Tran
*Assistant Examiner* — Sarah A Tran
(74) *Attorney, Agent, or Firm* — Hauptman Ham, LLP

(57) ABSTRACT

The present invention relates to a mobile robot for evaluating self-training based traversability comprising: an elevation map generator which generates a grid-cell based elevation map using point cloud data; a feature extractor which extracts a plurality of types of features on each grid cell from the elevation map; a data set generator which generates a labeled data set labeled for training and an unlabeled data set, based on label features set for at least two types of features among the plurality of types of features; and a self-training unit which generates an AI model for evaluating traversability by self-training using the labeled data set and the unlabeled data set. Accordingly, it is possible to create training data which increases training ability and then use the data for the self-training, whereby traversability can be evaluated while achieving navigation safety and efficiency.

6 Claims, 8 Drawing Sheets
(1 of 8 Drawing Sheet(s) Filed in Color)

(58) Field of Classification Search

CPC .. G05D 1/0212; G05D 1/0088; G05D 1/0221; G05D 1/024; G05D 1/0268; G05D 1/0274; G05D 2201/00; G05D 2201/02; G05D 2201/0213; G01S 17/00; G01S 17/88; G01S 17/89; G01S 17/93; G01S 17/931; B25J 11/00; B25J 9/00; B25J 9/16; B25J 9/1602; B25J 9/1628; B25J 9/1656; B25J 9/161; B25J 9/163; B25J 9/1664; B25J 9/1679

See application file for complete search history.

(56) References Cited

U.S. PATENT DOCUMENTS

2021/0276598 A1* 9/2021 Amirloo Abolfathi ...................... B60W 30/09
2021/0356972 A1* 11/2021 Kwon .................. G05D 1/0238

OTHER PUBLICATIONS

Panagiotis Papadakis, “Terrain traversability analysis methods for unmanned ground vehicles: A survey”, Engineering Applications of Artificial Intelligence, vol. 26, No. 4, pp. 1373-1385, 2013, cited in the Specification.

D. Langer et al., “A Behavior-Based System for Off-Road Navigation”, IEEE Transactions on Robotics and Automation, vol. 10, No. 6, pp. 776-783, 1994, cited in the Specification.

D. Joho et al., “Autonomous Exploration for 3D Map Learning”, Berlin, Heidelberg: Springer, 2007, cited in the Specification.

J. Larson et al., “Lidar Based Off-road Negative Obstacle Detection and Analysis”, Proceedings, International IEEE Conference on Intelligent Transportation Systems, 2011, pp. 192-197, cited in the Specification.

J. Ahtiainen et al., “Normal Distributions Transform Traversability Maps: LIDAR-Only Approach for Traversability Mapping in Outdoor Environments”, Journal of Field Robotics, vol. 34, No. 3, pp. 600-621, 2017, cited in the Specification.

* cited by examiner

MOBILE ROBOT CAPABLE OF EVALUATING SELF-TRAINING BASED TRAVERSABILITY

CROSS-REFERENCE TO RELATED APPLICATION

This application claims priority under 35 U.S.C. § 119 to Korean Patent Application No. 10-2020-0185906, filed on Dec. 29, 2020, in the Korean Intellectual Property Office, the entire contents of which are hereby incorporated by reference.

TECHNICAL FIELD

The present invention relates to a mobile robot capable of evaluating self-training based traversability and in particular to a mobile robot capable of evaluating self-training based traversability which evaluates the traversability by creating an AI model through a self-training based learning.

BACKGROUND ART

In recent years, mobile service robots with autonomous navigation capability have been commercialized in urban environments where robots and humans coexist. Much effort has been devoted to achieving the safe navigation of mobile robots in such environments.

The autonomous navigation systems equipped with horizontal 2D LiDAR sensors have successfully operated in structured indoor environments. However, since urban environments are composed of 3D terrain structures, assuming that such environments are planar does not guarantee the mobility and the safety of the autonomous systems.

Even though the urban environments are the structured environments made of paved ground, a typical terrain contains hazardous regions for mobile robots such as ground steps, stairs, or holes. Failure to avoid terrain obstacles introduces the risk of a robot being stuck or overturn. Furthermore, there are dynamic obstacles as well as low dynamic objects such as signboards, parked vehicles, or construction sites. Therefore, the traversability analysis that classifies nearby terrains as traversable and non-traversable has become an essential prerequisite for autonomous navigation in the urban environments.

A substantial number of studies have been conducted for traversability analysis based on camera, LiDAR, or a fusion of the camera and LiDAR. Although the vision-based methods have advantages of the dense point cloud that they provide, there is a well-known problem of being sensitive to illumination changes.

Meanwhile, the Li-DAR sensors provide accurate and long-range measurements regardless of lighting changes. Recently, as the price of 3D LiDAR sensors has been gradually decreasing, the number of autonomous navigation systems equipped with 3D LiDAR sensors is increasing. In this context, traversability analysis based on 3D point clouds has gained importance.

In a survey of terrain traversability analysis for unmanned ground vehicles, Papadakis presented that digital elevation maps (DEM), or 2.5D elevation maps, have been a predominant approach for point cloud-based traversability analysis in the paper "Terrain traversability analysis methods for unmanned ground vehicles: A survey (Engineering Applications of Artificial Intelligence, vol. 26, no. 4, pp. 1373-1385, 2013).

The elevation map has a limitation in that the amount of information is reduced compared to using full point clouds. However, the structure is simple, and it is highly scalable to handle large amounts of point clouds.

As one of the earliest traversability analysis based on elevation map, D. Langer, J. K. Rosenblatt, and M. Hebert "A behavior-based system for off-road navigation (IEEE Transactions on Robotics and Automation, vol. 10, no. 6, pp. 776-783, 1994) computed the features of step, slope, and height variance of a grid cell.

The grid cell is classified untraversable if the features exceed certain thresholds for vehicles specification. Similarly, many studies have performed traversability analysis using the same features in many studies.

D. Joho, C. Stachniss, P. Pfaff, and W. Burgard "Autonomous exploration for 3D map learning (Berlin, Heidelberg: Springer, 2007)" performed a traversability analysis for the exploration of an autonomous mobile robot.

Here, the traversability of a grid cell was computed by the linear product of the features. Besides, a weighted sum of the features is used to generate a traversability map for a legged robot.

Meanwhile, supervised learning has been widely exploited for traversability analysis. Cells in grid type maps are classified as traversable or non-traversable with a trained classifier. As one example, J. Larson and M. Trivedi "Lidar based off-road negative obstacle detection and analysis (Proceedings, International IEEE Conference on Intelligent Transportation Systems, 2011, pp. 192-197)" proposed a support vector machine (SVM) based classifier and a negative obstacle detector for traversability analysis in an off-road environment. As another example, methods for traversability analysis applying machine learning algorithms, such as Markov Random Field, Bayesian classifier, SVM, random forest have been provided. Further, since the breakthrough in machine learning after the introduction of neural networks, multilayer perceptron (MLP), convolutional neural network (CNN), etc. are exploited to traversability analysis for mobile robots.

In general, supervised learning involves exhausting tasks of the hand-labeling process to construct a training data set. An alternative to alleviating the hand labeling process is the use of synthetic data from the simulator. However, training on the labeled data obtained from the real-world should be conducted for practical use. Learning from demonstration with the positive samples collected from the footprint of a manually steered robot can be another alternative to hand-labeled data.

In this sense, detecting hazardous regions considered an anomaly detection problem, which can be employed by statistical test, Positive Naive Bayes classifier, Gaussian process, or support vector data description. However, if data is acquired only on relatively flat terrain, the classifier can be trained conservatively.

In J. Ahtiainen, T. Stoyanov, and J. Saarinen "Normal Distributions Transform Traversability Maps LIDAR-Only Approach for Traversability Mapping in Outdoor Environments (Journal of Field Robotics, vol. 34, no. 3, pp. 600-621, 2017), the authors detected the ground plane and generated negative samples, i.e., obstacles, from the grid cells except the area of the ground plane, then apply them to SVM together with positive samples. However, because not all of the negatively labeled samples are non-traversable, training on weakly-labeled data sets causes performance degradation of classifiers.

Despite the suggestion of the method mentioned above, it is still essential to apply traversability analysis for real world navigation in urban environments. Service robots that perform tasks such as delivery, patrol, etc. tend to pursue safety and navigation efficiency, minimizing unnecessary stoppage and bypass. Also, since the curb or guardrail limits navigation direction, a reliable method to detect traversable region is required in order not to be stuck in the middle of the road.

DISCLOSURE

Technical Problem

Accordingly, the present invention is provided to solve the above problems. The object of the invention is to provide a mobile robot capable of evaluating self-training based traversability by creating training data which increases training ability and using the data for the self-training, resulting in navigation stability and efficiency.

Technical Solution

The above object is accomplished by a mobile robot for evaluating self-training based traversability comprising: an elevation map generator which generates a grid-cell based elevation map using point cloud data; a feature extractor which extracts a plurality of types of features on each grid cell from the elevation map; a data set generator which generates a labeled data set which is labeled and an unlabeled data set for training, based on labeling features set for at least two types of features among the plurality of types of features; and a self-training unit which generates an AI model for evaluating traversability by self-training using the labeled data set and the unlabeled data set.

Here, the data set generator may generate the labeled data set in such a manner that a grid cell having the labeling features above a preregistered threshold is decided to be non-traversable and the features of the corresponding grid cell are labeled as negative, and that a grid cell having the labeling features below a preregistered threshold is decided to be traversable and the features of the corresponding grid cell are labeled as positive. The grid cell labeled as positive may be extracted only on the navigation trajectory of the mobile robot, and the features for the other grid cell not included in the labeled data set may be generated as unlabeled data set.

Also, the features may comprise absolute height difference of the grid cell, slope of the grid cell, curvature of the grid cell, roughness of the grid cell, and edge of the grid cell, and the labeling features comprises the absolute height difference and the slope.

Also, when both the absolute height difference and the slope are above the threshold, the data set generator may decide that the corresponding grid cell is non-traversable.

Further, the self-training unit may be configured to perform:

- step (a) of training an AI based classifier using the labeled data set as training data;
- step (b) of predicting traversability for the grid cell consisting of the unlabeled data set by inputting the unlabeled data set as input data to the classifier trained at the step (a);
- step (c) of classifying the grid cell consisting of the unlabeled data set into traversable grid cell, non-traversable grid cell and unlabeled grid cell, based on results predicted at the step (b);
- step (d) of labeling the features of the traversable grid cell as positive, labeling the features of the non-traversable grid cell as negative, and then adding the labeled features to the labeled data set; and
- step (e) of recreating the unlabeled data set by means of the features of the unlabeled grid cell;
- wherein the classifier trained at the step (a) is created as the AI model by repeating the steps (a) to (e) until a predetermined termination requirement is met.

Also, at the step (c), the self-training unit may classify the grid cell consisting of the unlabeled data set into the traversable grid cell, the non-traversable grid cell and the unlabeled grid cell in accordance with the probability based on the results predicted by the step (b).

Also, the self-training unit may decide that the termination requirement is met when the number of the unlabeled grid cells which are recreated as the unlabeled data set at the step (e) is less than a predetermined number.

Also, the mobile robot may further comprise:

- a robot controller configured to create a new elevation map by point cloud data newly obtained by the elevation map generator during a new travel of the mobile robot; configured to control the feature extractor to extract a plurality of types of new features from the new elevation map; and configured to control the AI model to predict the traversability of each grid cell by using the new features as input data of the AI model, and
- a traversable map generator which creates a traversable map based on the traversability of each grid cell predicted by the AI model.

Advantageous Effects

According to the above arrangement, a mobile robot capable of evaluating self-training based traversability by creating training data which increases training ability and using the data for the self-training, resulting in navigation safety and efficiency can be provided.

DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Advantages and features of the present invention and the method for achieving them can be understood from embodiments described in detail hereinafter referring to attached drawings. The present invention is not limited to the embodiment disclosed below, but is provided in various arrangements. The embodiments of the present invention are provided to fully complete the disclosure and to make the scope of the invention to those skilled in the art understand completely. The present invention is defined only by the scope of the claims. The same reference number indicates the same element in the whole specification.

Hereinafter, embodiments for the invention will be described referring to the attached drawing.

Figure 1:
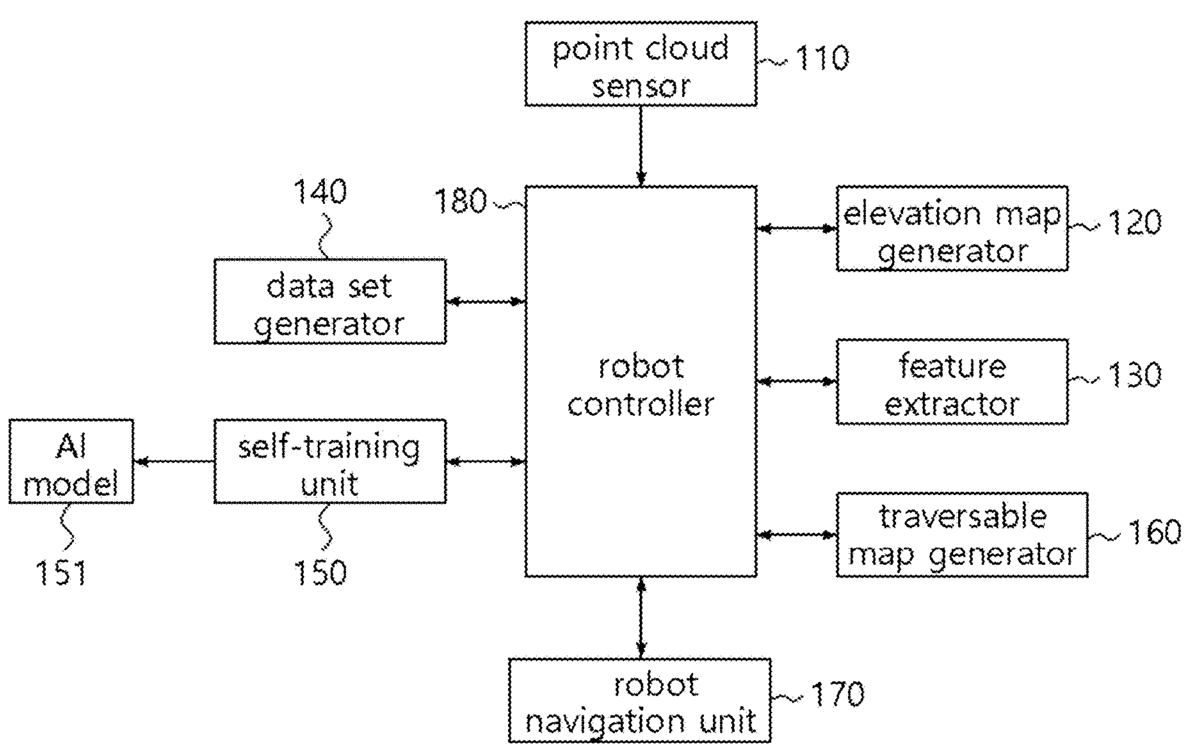
FIG. 1 represents a mobile robot which evaluates a self-training approach based traversability according to an embodiment of the present invention.

FIG. 1 represents a mobile robot 100 which evaluates a self-training approach based traversability according to an embodiment of the present invention.

Referring to FIG. 1, the mobile robot 100 according to the embodiment of the present invention comprises an elevation map generator 120, a feature extractor 130, a data set generator 140 and a self-training unit 150. Also, the mobile robot 100 according to the embodiment of the present invention comprises a point cloud sensor 110 and a robot controller 180.

The point cloud sensor 110 senses a navigation environment during the travel of the mobile robot 100 and obtains a point cloud data. In one embodiment, for example, the point cloud sensor 110 is provided as a 3D LiDAR sensor or a stereo camera to obtain 3D data of each point cloud.

Figure 2A:
FIG. 2A represents an example of outside surroundings as an actual navigation environment.
Figure 2B:
FIG. 2B represents an example of point cloud data obtained by the 3D LiDAR sensor.

FIG. 2A represents an example of outside surroundings as an actual navigation environment and FIG. 2B represents an example of point cloud data obtained by the 3D LiDAR sensor.

The elevation map generator 120 generates an elevation map based on grid cells using point cloud data obtained by the point cloud sensor 110.

Figure 3:
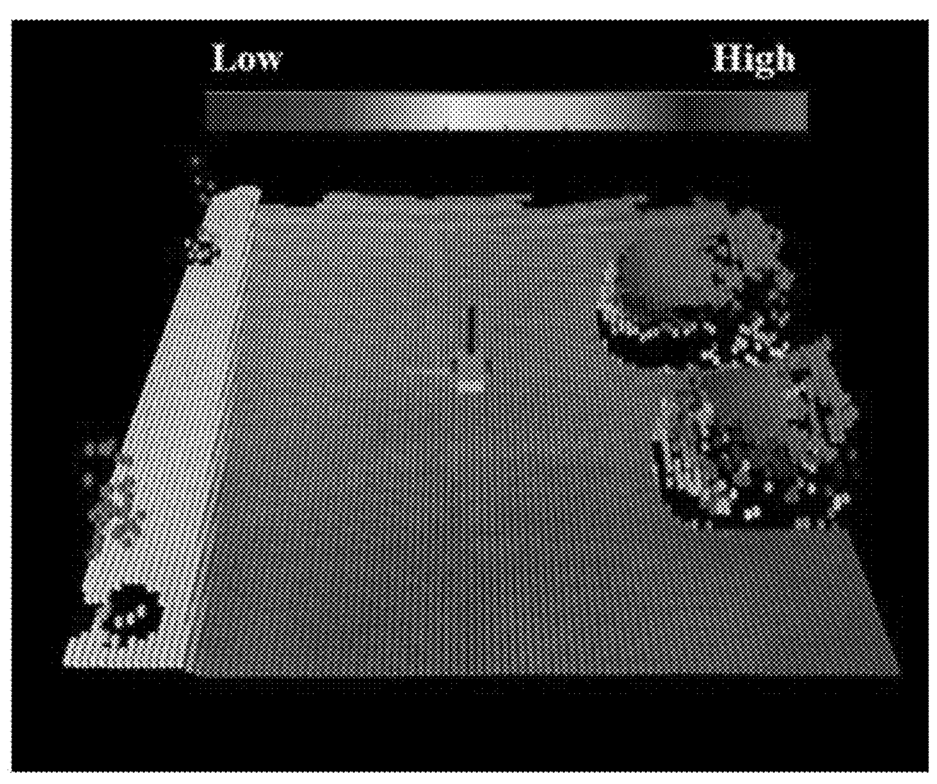
FIG. 3 represents an example of an elevation map generated by the elevation map generator of the mobile robot according to one embodiment of the present invention, using the point cloud data shown in FIG. 2B.

FIG. 3 represents an example of an elevation map generated by the elevation map generator 120 of the mobile robot 100 according to one embodiment of the present invention, using the point cloud data shown in FIG. 2B.

Each grid cell on the elevation map according to one embodiment of the present invention contains height attributes such as mean and variance of elevation, maximum and minimum elevation.

The feature extractor 130 extracts a plurality of types of features for each grid cell from the elevation map generated by the elevation map generator 120. In one embodiment of the present invention, for example, features comprise absolute height difference of a grid cell, slope of a grid cell, curvature of a grid cell, roughness of a grid cell, and edge of grid cell.

Here, the absolute height difference can be calculated by the difference between the maximum and minimum height value, $\max(h_{ij})$ and $\min(h_{ij})$ of a given grid cell. The absolute height difference reflects the maximum allowable step of the mobile robot 100.

Slope, roughness, and curvature are computed from the eigenvalues of the covariance matrix of the neighboring points. From sorted eigenvalues $\lambda_2 \geq \lambda_1 \geq \lambda_0 \geq 0$, the smallest eigenvalue is roughness feature, which means the variance of points along the corresponding eigenvector. The eigenvector $\vec{e}_0$ that corresponds to the smallest eigenvalue is the normal vector of the grid cell. The slope is angle between the normal vector and the unit vector $\vec{n}_z$ in the z axis of the world coordinate, which is calculated by dot product. Here, the absolute height difference, roughness and slope can be calculated by the following equation 1.

$$f_{step} = \max(h_{ij}) - \min(h_{ij})$$
$$f_{roughness} = \lambda_0$$
$$f_{slope} = \cos^{-1}(\vec{e_0} \cdot \vec{n_z}) \quad \text{[Equation 1]}$$

A curvature, the second derivative of a curved surface can be calculated by the following equation 2.

$$f_{curvature} = \frac{\lambda_0}{\lambda_0 + \lambda_1 + \lambda_2} \quad \text{[Equation 2]}$$

The edge feature is the difference of height between a cell of interest and its neighboring cells. A kernel which is similar to the kernel used for edge detection in image processing is applied. A difference is that the convolution is applied only to the valid cells that are observed by a sensor more than once.

The kernel element corresponding to the non-valid cell is zero, and the kernel element corresponding to the valid neighboring cell is −1. The central value of kernel, which is for the current cell, is set to the number of neighboring cells. This can be defined as the following equation 3.

$$f_{edge} = \frac{1}{k} \sum_{i=-n}^{n} \sum_{j=-n}^{n} w(i, j) \cdot h_{i,j} \quad \text{[Equation 3]}$$

Herein, k is the number of the valid cells and w(i,j) is the kernel element of the i-th row and j-th column grid cell. The width of the kernel w is 2n+1.

Meanwhile, the data set generator 140 according to one embodiment of the present invention generates a labeled data set which is labeled for the training, using the labeling features set for at least two types among plural types of features.

In one embodiment of the present invention, for example, the absolute height difference and the slope among the above five types of features are set to the labeling features. The absolute height difference, i.e., steps and slopes have allowable thresholds depending on specifications of a mobile robot 100. It is preferable that steps and slopes are set as the labeling features since they can be intuitively determined through user's experience.

Figure 4:
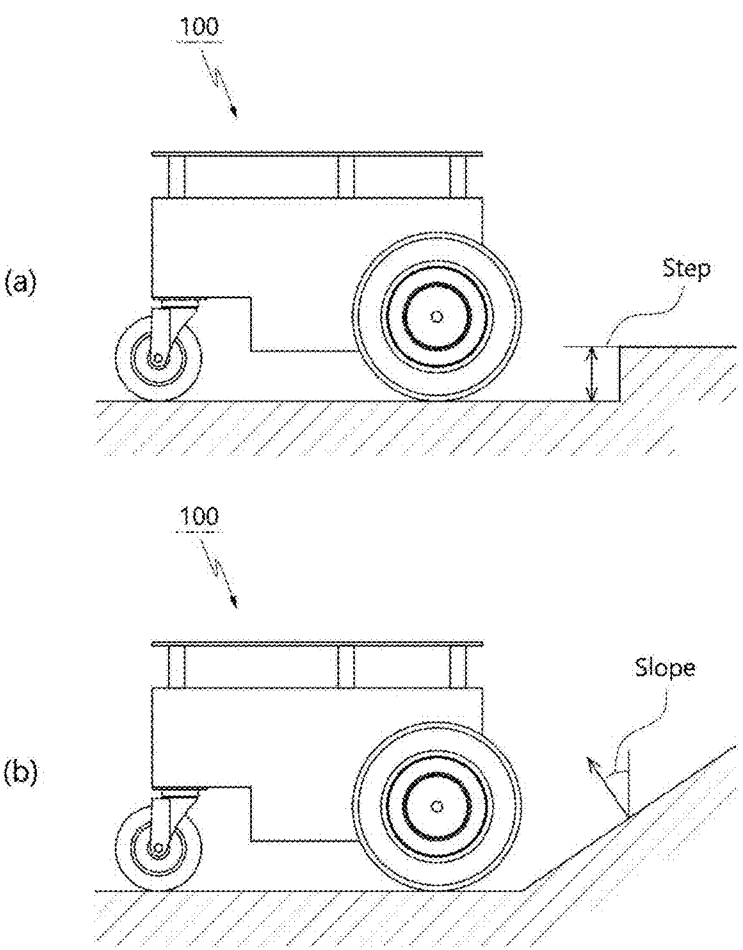
FIG. 4 describes labeling features according to the embodiment of the present invention.

That is, after checking the specification of the mobile robot 100, a user registers the thresholds which are described below. The use of the mobile robot 100 as to the steps and slopes is checked and then the thresholds can be intuitively set. This can be easily seen in FIG. 4.

Here, the data set generator 140 according to the embodiment of the present invention decides that the grid cells having labeling features (e.g., the absolute height difference and slope) above the predetermined thresholds are non-traversable and then, the features of the corresponding grid cell, i.e., absolute height difference of a grid cell, slope of a grid cell, curvature of a grid cell, roughness of a grid cell and edge of a grid cell are labeled as negative.

Similarly, the data set generator 140 according to the embodiment of the present invention is configured to decide that grid cells with the labeling features below the thresholds are traversable and then, the features of the corresponding grid cell are labeled as positive.

Figure 5:
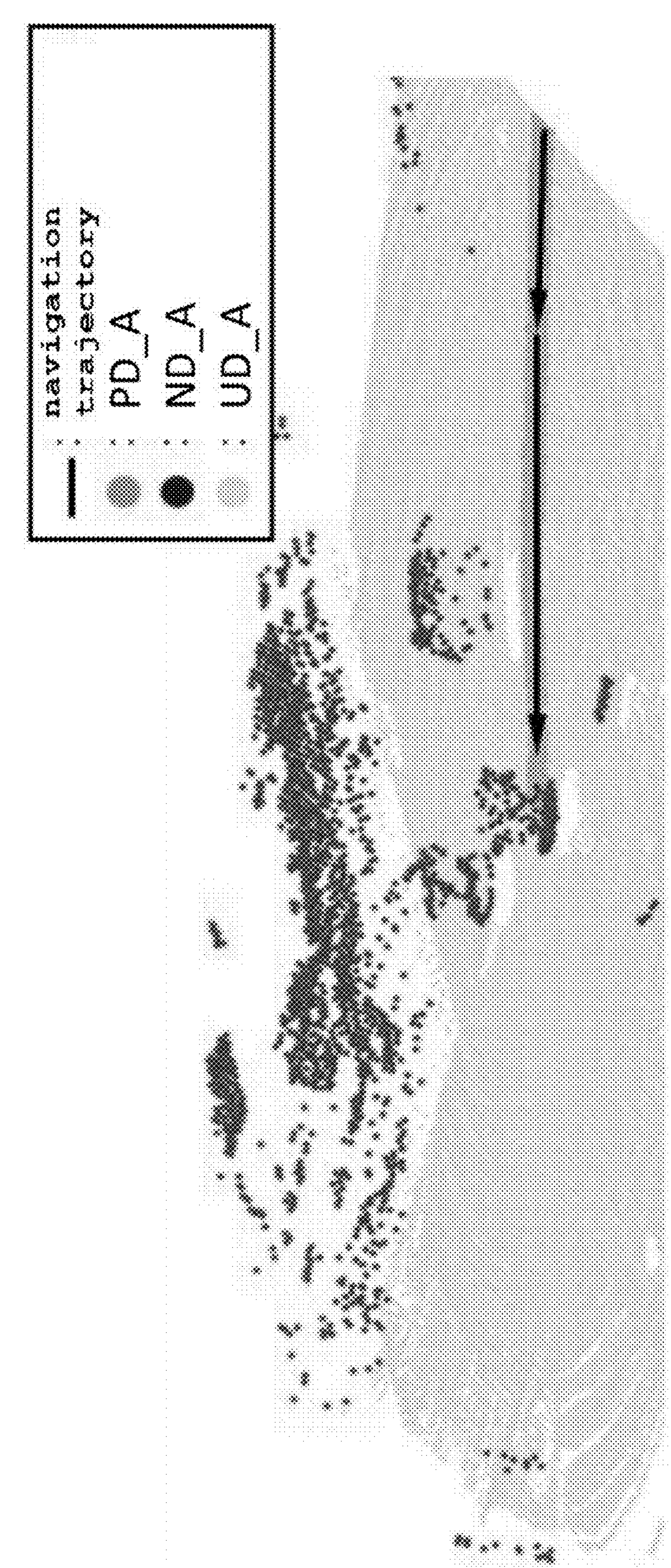
FIG. 5 describes labeled data set and unlabeled data set according to the embodiment of the present invention.

Here, in the embodiment of the present invention, the grid cell which is labeled as positive is extracted only from a navigation trajectory along which the mobile robot 100 has already traveled. Referring to FIG. 5, the navigation trajectory of the mobile robot 100 is a path on which the mobile robot 100 already traveled and thus, indicates clearly a traversable area.

Therefore, according to the present invention, all the grid cells having labeling features below thresholds are not classified as traversable cells. Instead, traversable grid cells are extracted only from the grid cells on the navigation trajectory along which the mobile robot 100 already travelled, i.e., on a doubtless traversable area, and then the extracted cells are labeled as positive.

For example, if the traversable area is determined based on thresholds, gray-colored area as shown in FIG. 5 may be classified as traversable. However, according to the present invention, traversable area is obtained only on the navigation trajectory of the mobile robot 100. Therefore, an area with features above thresholds is labeled as non-traversable area (ND_A), an area with features below thresholds while being within the trajectory of the mobile robot 100 is labeled as traversable area (PD_A), and the other area is classified as unlabeled area (UD_A).

The data set generator 140 generates a labeled data set based on a combination of features labeled as negative and a combination of features labeled as positive, and generates an unlabeled data set based on the other features of grid cells which are not included in the labeled data set, i.e., based on unlabeled features.

Here, the labeled data set and unlabeled data set comprise feature vector f=(fstep; fslope; frough; fcurv; fedge) which consists of features. The feature vector included in the labeled data set is labeled as negative or positive based on the labeling features as described above, and the feature vector in the unlabeled data set is not labeled.

Here, in the embodiment of the present invention, only when both the absolute height difference and slope which are the labeling features are above thresholds, the corresponding grid cell is evaluated as non-traversable, such that only grid cells which are more clearly regarded as non-traversable are registered as negative.

Hereinafter, for convenience sake, feature vector labeled as negative is defined as ND, feature vector labeled as positive is defined as PD, and unlabeled feature vector is defined as UD.

If the labeled data set and the unlabeled data set are generated as described above, the self-training unit 150 generates an AI model 151 for evaluating the traversability through a self-training based on the labeled data set and the unlabeled data set.

Figure 6:
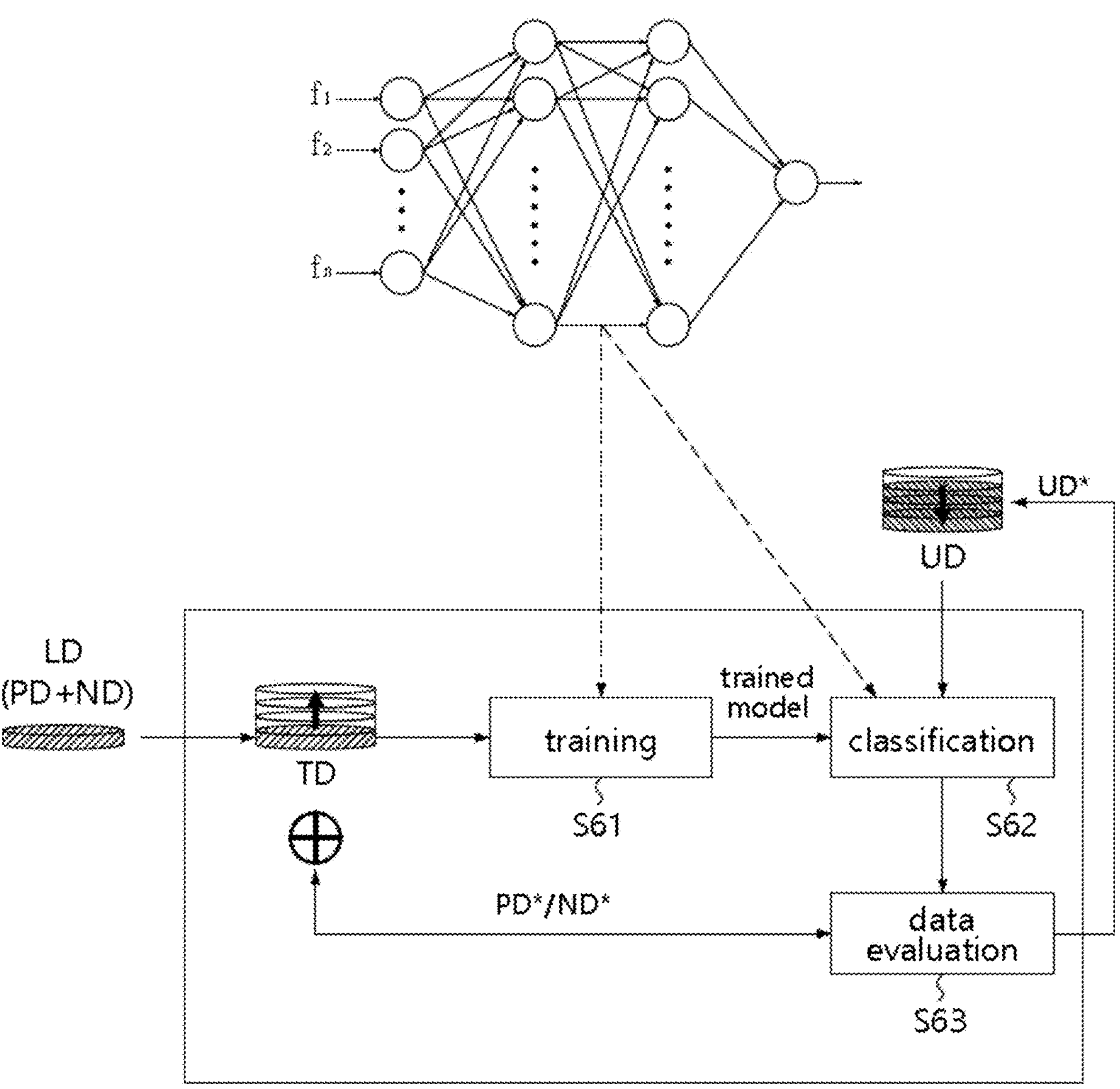
FIG. 6 schematically shows a process by which the self-training unit generates an AI model through the self-training according to the embodiment of the present invention.

FIG. 6 schematically shows a process by which the self-training unit 150 generates an AI model 151 through the self-training according to the embodiment of the present invention.

Referring to FIG. 6, as explained above, the self-training unit 150 trains a classifier by using the labeled data set (LD) consisting of PD and ND as training data of a registered AI based classifier The present invention uses a neural network based MLP (multi-layer perceptron) classifier, but the technical feature of the invention is not limited to the MLP. Other classification model suitable for the data set classification can be also used.

Here, as shown in FIG. 6, for a training process and a prediction process (S62) thereafter, all features are applied to perform the leaning and prediction processes. That is, for example, the training features are exploited only for the labeling of PD and ND which are used for the initial training data, and all features are input for the training and prediction process performed by the classifier.

If the training process for the classifier is completed as described above, the traversability for the grid cells consisting of the unlabeled data set is predicted by inputting the unlabeled data set (UD) as input data of the classifier and thus, the grid cells consisting of the unlabeled data are classified as traversable grid cells, non-traversable grid cells and unlabeled grid cells (S62).

Here, the predicted result of the classifier is output as probability and a process for evaluating the data consisting of unlabeled data set is based on the probability (S63).

In more detail, if the probability is greater than registered maximum value, grid cells consisting of unlabeled data set is classified as traversable grid cells. If the probability is less than registered minimum value, the grid cells is classified as non-traversable grid cells. If the probability is between the maximum value and the minimum value, the grid cells are classified as unlabeled grid cells.

When the grid cells consisting of the unlabeled data set is classified as traversable grid cells, non-traversable grid cells, and unlabeled grid cells as described above, the self-training unit 150 generates additional labeled data set (PD*, ND*) by labeling features of the traversable grid cells as positive and by labeling features of the non-traversable grid cells as negative and then adds the additional labeled data set to the previous labeled data set.

Then, by means of the self-training unit 150, the remainder which is not contained in the labeled data set, i.e., the unlabeled grid cell is recreated as new unlabeled data set (UD*).

The self-training process as described above is configured such that through a training process (S61) using newly updated labeled data set, a classification process (S62) for classifying the unlabeled data set recreated using the trained classifier, and a data evaluation process (S63) for the classification results, the update of the labeled data set and the recreation of the unlabeled data set is repeated until the predetermined end condition is met, and the classifier trained until the condition was met is created as a final AI model 151.

According to the present invention, for example, when the number of unlabeled grid cells which are recreated as unlabeled data set is less than a predetermined number, it is decided that a termination requirement is met. That is, the self-training process is repeated until the number of unlabeled grid cells converges to a number which is less than a certain number. Here, when the probability output by the classifier during the self-training process is between the minimum value and the maximum value as described above, the corresponding grid cell is classified as an unlabeled grid cell.

When the final AI model 151 is created by the above process, the traversability on the navigation environment is evaluated through the AI model 151 in the navigation process of the mobile robot 100.

More specifically, during a new navigation process controlled by a robot navigation unit 170, the robot controller 180 controls an elevation map generator 120 to create a new elevation map using point clouds data obtained by the point cloud sensor 110.

Further, the robot controller 180 controls a feature extractor 130 to extract a plurality of types of features from a newly created elevation map. Here, the robot controller 180 controls the AI model 151 to input features extracted by the feature extractor 130 such as the absolute height difference, slope, curvature of a grid cell, roughness and edge features as input data of the AI model 151 and to predict the traversability of each grid cell.

Figure 7:
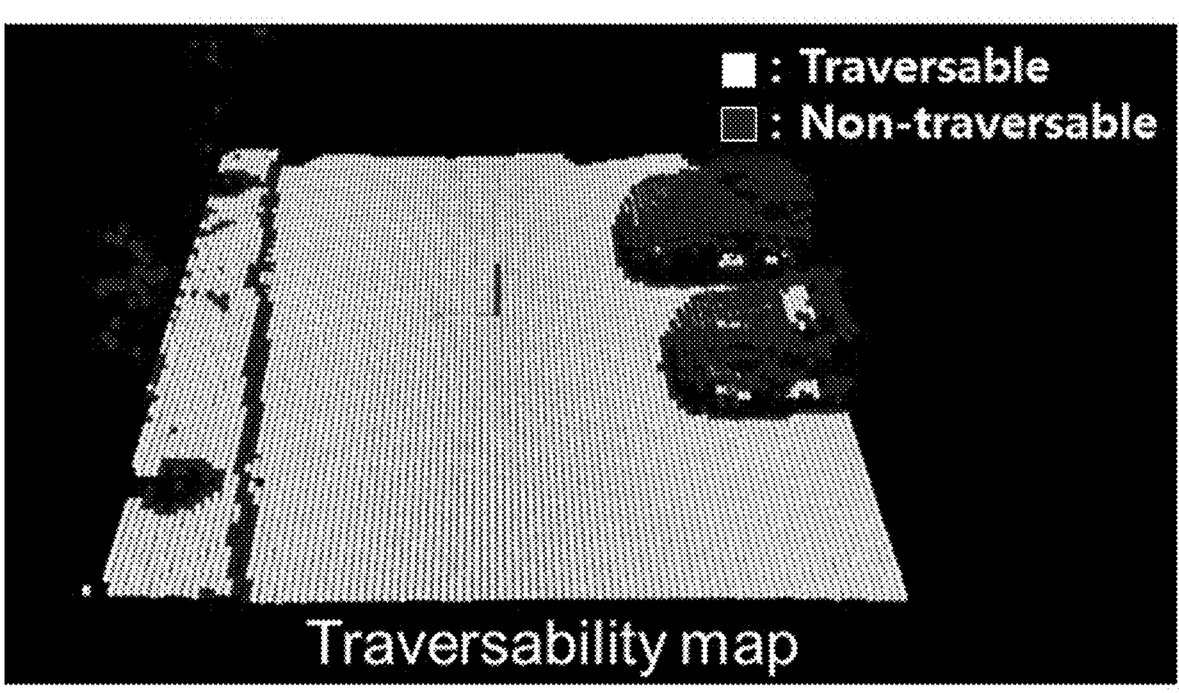
FIG. 7 represents an example of the traversable map created on the navigation environment shown in FIGS. 2A, 2B, and 3 according to the embodiment of the present invention.

Here, in the embodiment of the present invention, as shown in FIG. 1, the present invention may further comprise a traversable map generator 160 which creates a traversable map based on the traversability of each grid cell predicted by the AI model 151. FIG. 7 represents an example of the traversable map created for the navigation environment shown in FIGS. 2A, 2B, and 3.

The above descriptions are intended to exemplarily explain the technical spirit of the present invention and those skilled in the art easily can modify and change the invention without departing from the essential features. Therefore, the embodiments are intended to exemplarily explain the technical idea or spirit of the present invention, not intended to limit it. The scope of technical idea or spirit is not limited by the embodiments. The scope of the present invention will be determined by attached claims and it should be construed that the scope of the present invention includes all technical spirit and idea of the claims and their equivalents.

| [explanation of reference number] | |
|---|---|
| 100: mobile robot | 110: point cloud sensor |
| 120: elevation map generator | 130: feature extractor |
| 140: data set generator | 150: self-training unit |
| 151: AI model | 160: traversable map generator |
| 170: robot navigation unit | 180: robot controller |

The invention claimed is:

1. A mobile robot for evaluating self-training based traversability comprising:

an elevation map generator which generates a grid-cell based elevation map using point cloud data;

a feature extractor which extracts a plurality of types of features on each grid cell from the elevation map;

a data set generator which generates a labeled data set which is labeled and an unlabeled data set for training, based on labeling features set for at least two types of features among the plurality of types of features; and a self-training unit which generates an AI model for evaluating traversability by self-training using the labeled data set and the unlabeled data set, wherein the data set generator generates the labeled data set in such a manner that a grid cell having the labeling features above a preregistered threshold is decided to be non-traversable and the features of the corresponding grid cell are labeled as negative, and that a grid cell having the labeling features below the preregistered threshold is decided to be traversable and the features of the corresponding grid cell are labeled as positive, wherein the grid cell labeled as positive is extracted only on the navigation trajectory which is the path on which the mobile robot already traveled, among the grid cells having the labeling features below the preregistered threshold, and wherein the features for the other grid cell not included in the labeled data set is generated as unlabeled data set, wherein the self-training unit is configured to perform:

training a classifier using the labeled data set as training data;

predicting traversability for the grid cell consisting of the unlabeled data set by inputting the unlabeled data set as input data to the trained classifier;

classifying the grid cell consisting of the unlabeled data set into traversable grid cell, non-traversable grid cell and unlabeled grid cell, based on the prediction results;

labeling the features of the traversable grid cell as positive, labeling the features of the non-traversable grid cell as negative, and then adding the labeled features to the labeled data set; and recreating the unlabeled data set by means of the features of the unlabeled grid cell;

wherein the trained classifier is created as the AI model by repeating the training a classifier to the recreating the unlabeled data until a predetermined termination requirement is met.

2. The mobile robot according to claim 1, wherein the features comprise absolute height difference of the grid cell, slope of the grid cell, curvature of the grid cell, roughness of the grid cell, and edge of the grid cell, and the labeling feature comprises the absolute height difference and the slope.

3. The mobile robot according to claim 1, wherein when both the absolute height difference and the slope are above the threshold, the data set generator decides that the corresponding grid cell is non-traversable.

4. The mobile robot according to claim 1, wherein the self-training unit classifies the grid cell consisting of the unlabeled data set into the traversable grid cell, the non-traversable grid cell and the unlabeled grid cell in accordance with the probability based on the prediction results.

5. The mobile robot according to claim 1, wherein the self-training unit is configured to decide that the termination requirement is met when the number of the unlabeled grid cells which are recreated as the unlabeled data set is less than a predetermined number.

6. The mobile robot according to claim 1, further comprising:

a robot controller configured to create a new elevation map by point cloud data newly obtained by the elevation map generator during a new travel of the mobile robot; configured to control the feature extractor to extract a plurality of types of new features from the new elevation map; and configured to control the AI model to predict the traversability of each grid cell by using the new features as input data of the AI model, and a traversable map generator which creates a traversable map based on the traversability of each grid cell predicted by the AI model.

* * * * *